Oct. 24, 1950   A. A. ERICSON   2,526,646
HYDRAULIC FEED SYSTEM
Filed Dec. 9, 1944
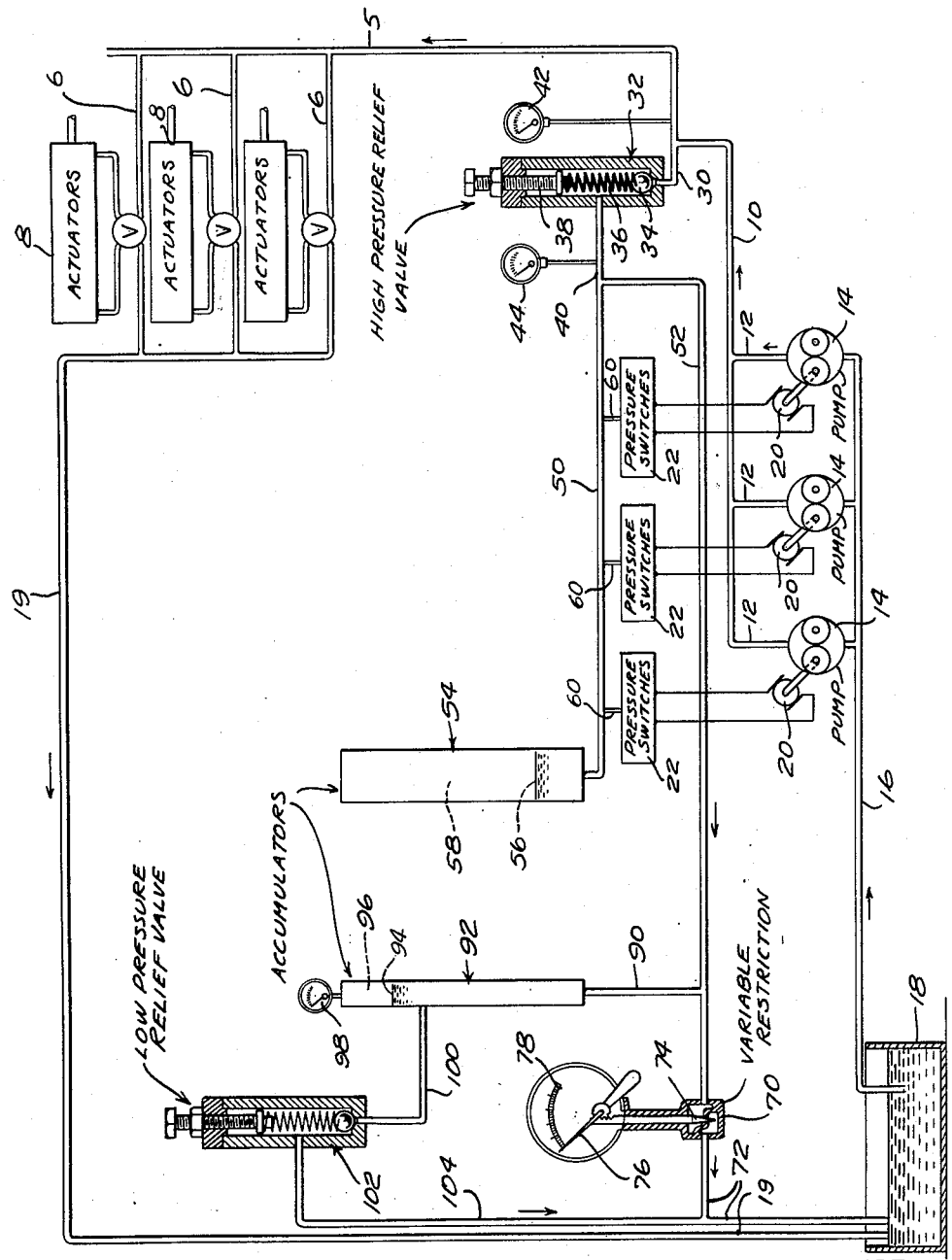
INVENTOR
ALBERT A. ERICSON.
BY
Moses, Nolte, Crews & Berry
ATTORNEYS Patented Oct. 24, 1950

2,526,646

UNITED STATES PATENT OFFICE 2,526,646

HYDRAULIC FEED SYSTEM

Albert A. Ericson, Massapequa Park, N. Y., assignor to The Farmingdale Corporation, a corporation of New York Application December 9, 1944, Serial No. 567,437

4 Claims. (Cl. 103—11)

This invention relates to systems for supplying hydraulic pressure for actuating a number of instrumentalities, one or more of which may be actuated at any one time, thereby providing a variable load.

The system may be used to supply any kind of a variable load in which it is desired to maintain an adequate supply of liquid at a substantially uniform pressure.

The system finds especial utility as a means for supplying liquids under pressure for actuating a plurality of hydraulically driven machine tools. These tools are operated intermittently, and the load on the main supplying the pressure is thereby constantly varying. In order that the tools may work efficiently, it is essential that the pressure and volume of the liquid supplied be kept up to the required degree at all times. Sometimes this is done by pumping a large excess of liquid and returning to the reservoir all unused liquid. If the excess of liquid thus circulating is large, it is a very wasteful operation. The liquid being circulated also becomes overheated, resulting in loss of viscosity and other undesirable effects.

In accordance with the present invention a number of pumps are provided, each with its own driving means, and with pressure responsive means for controlling the operation of each pump or driving means, so as to throw one or more of the pumps into or out of operation as may be necessary to supply the demand for liquid.

The present invention provides for the control of these pressure responsive devices by means of the pressure of a small amount of surplus liquid which is by-passed through a high pressure relief valve and through an adjustable restriction or choke. As the demand for liquid increases the flow of surplus liquid by-passed falls, while if there is a decrease in demand the flow of liquid in the by-pass increases. As soon as the surplus liquid flows in sufficient quantity to be effectively retarded by the restriction so as to appreciably raise the pressure, one or more of the pressure responsive devices are actuated so as to throw out of action the corresponding number of pumps, thereby promptly reducing the amount of liquid supplied. On the other hand, if the use of the liquid increases, the pressure of the surplus liquid falls and an additional pump or number of pumps come into operation.

It is the object of the present invention to provide a simple and effective hydraulic system of the character described which will take care of wide variations in the use of liquid and maintain an adequate supply of the same at all times, under a substantially uniform pressure. At the same time the control of the system is such that there is only a nominal loss due to recirculation of unused liquid.

In the accompanying drawing the figure is a diagrammatic view showing one preferred embodiment of the system.

Referring to the drawing in detail, 5 is the manifold or supply line having connections 6 to a number of hydraulic devices constituting the variable load on the system, and which are indicated by the actuators 8 of a number of machine tools (not shown). The main 5 is supplied with liquid under pressure from the pump manifold 10 which has branches 12 leading to a number of pumps 14, three being shown for the purpose of illustration. These pumps all draw the liquid through the suction line 16 from the liquid sump or reservoir 18. The liquid discharged from the actuators 8 is returned to the reservoir 18 through the discharge line 19. Each of the pumps is shown as driven by an electric motor 20, although it will be understood that any source of power for driving the pumps may be utilized. As shown the circuits of the electric motors 20 are arranged to be opened and closed by pressure switches 22. The switches close the circuits so as to start the motors when the pressure falls below a predetermined figure, and open the circuits so as to stop the motors when the pressure rises to a set pressure. Such switches, being well understood, need not be further described.

At the point where the pump manifold 10 joins the pressure line 5 is a branch pipe 30 leading to a high pressure relief valve 32 of usual construction. As shown diagrammatically the relief valve contains a ball valve member 34 held down by spring 36, the tension of which may be adjusted by a screw 38. When the pressure in the pipes 5, 10 and 30 is high enough to lift the ball 34 from its seat, there will be some leakage past the ball into the pipe 40. A gauge 42 may be provided on the high pressure side of the relief valve to show the pressure in the main, while the gauge 44 on the low pressure side of the valve indicates the pressure of the liquid escaping through the relief valve, which pressure is controlled in the manner later described. The spring 36 is set at such tension as to withstand the working pressure which it is desired to maintain in the feed line 5. This is usually a fairly substantial pressure, for instance, 600 lbs. per sq. in. being a desirable pressure for use in actuating many machine tools.

The pipe 40 has two branches 50 and 52. Branch 50 is a dead end branch which terminates at an accumulator 54 which will have more or less of the liquid in its lower end, as indicated at 56, above which is an air space 58. The accumulator is closed at the top so that the air in the air space is compressed more or less, depending upon the pressure in the pipe 50. Branch pipes 60 connects pipe 50 with the several pressure switches 22. These pressure switches are preferably arranged to operate at slightly different pressures so that they will act progressively. For instance, the first switch may operate to open the circuit at 10 lbs. per sq. in., the second one at 11½ lbs. per sq. in. pressure, and the third one at 13 lbs. per sq. in. pressure. Thus as the pressure in the pipe 50 increases the 10 lbs. per sq. in. pressure switch will be actuated so as to open the circuit of the motor of the first pump thereby stopping the pump. If the pressure in the pipe 50 increases to 11½ lbs. per sq. in. the second switch will be opened and the second pump stopped, whereas when the pressure reaches 13 lbs. per sq. in. the third switch will be opened and the third pump will stop. Obviously this arrangement can be continued to any number of pressure switches and pumps, which it will be necessary to employ. If the pressure drops to the point for which the switches are set to close, one after the other will close, thereby starting the pumps as required and supplying further liquid under pressure. The pressure at which an open switch will close is usually several pounds per square inch lower than the pressure at which a previously closed switch will open. Thus the switch which opens the circuit and stops its motor when a pressure of 13 lbs per sq. in. is reached may be set so as to close the circuit and start the motor when the pressure falls to 3 lbs. per sq. in. The switch which opens the circuit at 11½ lbs. per sq. in. may be set to close the circuit and start the motor at 1½ lbs. per sq. in. pressure. The switch which opens the circuit at the lowest pressure, say at 10 lbs. per sq. in., may desirably be set so as to close the circuit and start the motor when the pressure is zero. This keeps some pressure in the system at all times so that the system is always ready to operate as soon as one of the actuators is put into use. Thus the system is always ready to function, and does not go entirely out of operation even though all the actuators may be shut down for the time being. The pressures given are obviously merely examples and may be varied to suit the circumstances of the particular installation.

Accumulator 54 takes care of sudden surges, prevents shock and injury to the parts due to sudden changes in pressure, and prevents the switches from operating too quickly. For instance, if the increase in pressure is instantaneous due to some momentary cause, and does not represent a maintained increase in the load, such momentary increase in pressure will merely compress the air in the accumulator slightly without operating a pressure switch. However, if there is a substantial and sustained increase in pressure, then the switch would be operated to cut out one of the pumps. By properly choosing the proportions of the accumulator a very smooth and satisfactory operation of the system may be secured.

The liquid which passes the relief valve 32 cannot escape through the pipe 50 which, as stated, is a dead end pipe ending in a closed accumulator. Any quantity of liquid which flows past the relief valve passes into the branch pipe 52 from which it flows through the adjustable valve, choke or restriction 70 and into the return pipe 72 leading to the reservoir. The adjustable restriction 70 may take any suitable form such, for instance, as the needle valve 74 which may be set in adjusted position by means of the pointer 76 operating over the scale 78. By moving the pointer to the desired division on the scale, the restriction is adjusted by the movement of the needle valve. When the restriction is made smaller, the freedom of flow is reduced and the pressure in pipes 40, 50 and 52 will be increased more quickly. Thus the pressure switches will act sooner upon a rise in the pressure. If the restriction is opened, the pressure switches will not act quite so fast.

In order to take care of a larger flow past the relief valve 32, such as will take place if there is a sudden reduction of the load, a by-pass is provided to permit flow around the restriction 70. This by-pass comprises a pipe 90 leading to an accumulator 92 which is usually of such size as to contain a substantial body of liquid indicated at 94, and having a relatively small air space 96 above the level of the liquid. For convenience of adjustment a gauge 98 may be provided to show the pressure in the air space. Leading from the accumulator below the usual level of the liquid therein is a pipe 100 leading to a low pressure relief valve 102. Fluid passing the relief valve 102 passes through a pipe 104 to the return pipe 72. The relief valve 102 is preferably set for relatively low pressure, for instance 15 to 20 pounds per square inch. This determines the limit of pressure which may exist in pipes 50 and 52. If the pressure exceeds this amount, the relief valve 102 opens freely so as to permit free flow around the restriction 70 and back to the liquid reservoir. By making the air space 96 quite small the pressure control can be made sensitive, such control being obtained by adjusting the restrictions 74 and the pressure at which the relief valve 102 is actuated. A small air space such as 96 is desirable to prevent the effect of sudden minor surges in pressure, but owing to its small size slight sustained increases in pressure in the pipes 50 and 52 will cause the relief valve 102 to open so as to permit the flow of liquid.

Under stable conditions of operation, the restriction 74 should be adjusted so that practically all of the liquid passed by the main relief valve 32 will flow through this restriction and there will be little, if any, flow through the relief valve 102. When there is a sudden reduction of the load, however, then the surplus liquid delivered by the pumps to the manifold 10 will pass the valve 32 and valve 102. The passage of the liquid past the valve 102, however, indicates a pressure sufficient to actuate one or more of the pressure switches which will thereupon open, thereby shutting off one or more of the pumps 14.

If there is an increase in the load on the line 5, as by throwing additional hydraulic devices into operation, the reduction of pressure in the line 5 will cause the valve 32 to close, thereby cutting off flow to pipes 40, 50 and 52. This will result in a fall of pressure in the pipe 50 as soon as any air compressed in the accumulator 54 has forced sufficient liquid through the pipe 50 and into pipe 52 to permit the pressure to drop. This drop will result in the actuation of one or more of the pressure switches thereby starting a motor or motors, and the pumps actuated by such motors, and thus increase the flow of liquid. If the relief valves and restriction are properly adjusted a sufficient number of pumps will be maintained in operation so that there is about enough flow to pass through the relief valve 32 into pipe 52 and to pass through the restriction without substantial flow taking place through the relief valve 102. As the restriction is small the amount of flow back to the liquid reservoir under normal operation will be very small and will represent a negligible loss of power.

While I have illustrated and described in detail certain preferred forms of my invention, it is to be understood that changes may be made therein and the invention embodied in other structures. I do not, therefore, desire to limit myself to the specific construction illustrated, but intend to cover my invention broadly in whatever form its principles may be utilized.

What is claimed is:

1. In a hydraulic system for maintaining a supply of liquid in variable volume at a substantially uniform pressure for actuating a variable number of hydraulic devices, a supply line, a plurality of pumps connected thereto, a relief valve between the pumps and the supply line, a plurality of pressure responsive devices selectively controlling the actuation of the pumps, a dead end branch line connected with the discharge side of said relief valve and said pressure responsive devices, an accumulator in said branch line, a return line connected with the discharge side of said relief valve, and a variable restriction in said return line.

2. In a hydraulic system for maintaining a supply of liquid in variable volume at a substantially uniform pressure for actuating a variable number of hydraulic devices, a supply line, a plurality of pumps connected thereto, a relief valve between the pumps and the supply line, a plurality of pressure responsive devices selectively controlling the actuation of the pumps, a dead end branch line connected with the discharge side of said relief valve and said pressure responsive devices, an accumulator in said branch line, a return line connected with the discharge side of said relief valve, a variable restriction in said return line, and a by-pass around said variable restriction for by-passing liquid from said return line to the liquid reservoir, said by-pass containing an accumulator, said by-pass also containing a low pressure relief valve.

3. In a hydraulic system for maintaining a variable supply of liquid under substantially uniform pressure for actuating a variable hydraulic load, a supply line, a plurality of pumps connected thereto, a high pressure relief valve between the pumps and supply line, pressure responsive means selectively controlling the actuation of the pumps, a connection between said pressure responsive means and the discharge side of said high pressure relief valve, a return line connected with the discharge side of said high pressure relief valve, a variable restriction in said return line, a by-pass around said variable restriction for by-passing the liquid discharged from said high pressure relief valve around said variable restriction, and a low pressure relief valve in said by-pass.

4. In a hydraulic system for maintaining a variable supply of liquid under substantially uniform pressure for actuating a variable hydraulic load, a supply line, a plurality of pumps connected thereto, a high pressure relief valve between the pumps and supply line, pressure responsive means selectively controlling the actuation of the pumps, a connection between said pressure responsive means and the discharge side of said high pressure relief valve, an accumulator associated with said pressure responsive means, a return line connected with the discharge side of said high pressure relief valve, a variable restriction in said return line, a by-pass around said variable restriction for by-passing the liquid discharged from said high-pressure relief valve around said variable restriction, a low pressure relief valve in said by-pass, and an accumulator in said by-pass, said by-pass accumulator having a smaller air space than said accumulator associated with the pressure responsive means.

ALBERT A. ERICSON.

REFERENCES CITED

The following references are of record in the file of this patent:

UNITED STATES PATENTS

| Number | Name | Date |
|---|---|---|
| 1,717,814 | Strong et al. | June 18, 1929 |
| 2,223,415 | Groves | Dec. 3, 1940 |
| 2,237,574 | Persons | Apr. 8, 1941 |
| 2,246,940 | Hood | June 24, 1941 |

FOREIGN PATENTS

| Number | Country | Date |
|---|---|---|
| 25,879 | Great Britain | 1912 |